US012700071B2

(12) United States Patent
Cheng

(10) Patent No.: US 12,700,071 B2
(45) Date of Patent: Aug. 4, 2026

(54) IMAGE SENSING DEVICE AND HIGH DYNAMIC RANGE IMAGE GENERATION METHOD THEREOF

(71) Applicant: Acer Incorporated, New Taipei City (TW)

(72) Inventor: Chen-Ju Cheng, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 327 days.

(21) Appl. No.: 18/512,023

(22) Filed: Nov. 17, 2023

(65) Prior Publication Data

US 2025/0029221 A1    Jan. 23, 2025

(30) Foreign Application Priority Data

Jul. 21, 2023    (TW) ................................. 112127432

(51) Int. Cl.
*G06T 5/90* (2024.01)
*H04N 25/772* (2023.01)

(52) U.S. Cl.
CPC ............. *G06T 5/90* (2024.01); *H04N 25/772* (2023.01); *G06T 2207/20208* (2013.01)

(58) Field of Classification Search
None
See application file for complete search history.

(56) References Cited

U.S. PATENT DOCUMENTS

| | | | |
|---|---|---|---|
| 9,894,374 B2 | 2/2018 | Efremov et al. | |
| 11,379,959 B2 | 7/2022 | Meng et al. | |
| 2022/0123033 A1* | 4/2022 | Park | H04N 25/134 |
| 2022/0321821 A1* | 10/2022 | Tsai | H04N 25/00 |
| 2023/0388655 A1* | 11/2023 | Yin | H04N 23/56 |

FOREIGN PATENT DOCUMENTS

| | | |
|---|---|---|
| TW | 200926836 | 6/2009 |
| TW | 201733341 | 9/2017 |
| TW | 201735619 | 10/2017 |
| TW | 202046704 | 12/2020 |
| TW | 202320537 | 5/2023 |

* cited by examiner

*Primary Examiner* — Miya J Cato
(74) *Attorney, Agent, or Firm* — JCIPRNET

(57) ABSTRACT

An image sensing device and an HDR image generation method thereof are provided. The image sensing device includes a pixel array, a readout circuit, and a processing circuit. The pixel array includes multiple sensing pixels electrically connected to multiple data readout lines. The readout circuit is electrically connected to the data readout lines and the processing circuit, and the data readout lines of each sensing pixel include a first data readout line and a second data readout line. Each sensing pixel outputs a first sensing signal corresponding to a first exposure period within a row exposure period through the first data readout line, and each sensing pixel outputs a second sensing signal corresponding to a second exposure period within the row exposure period through the second data readout line. The processing circuit generates an HDR image based on the first sensing signal and the second sensing signal.

10 Claims, 8 Drawing Sheets

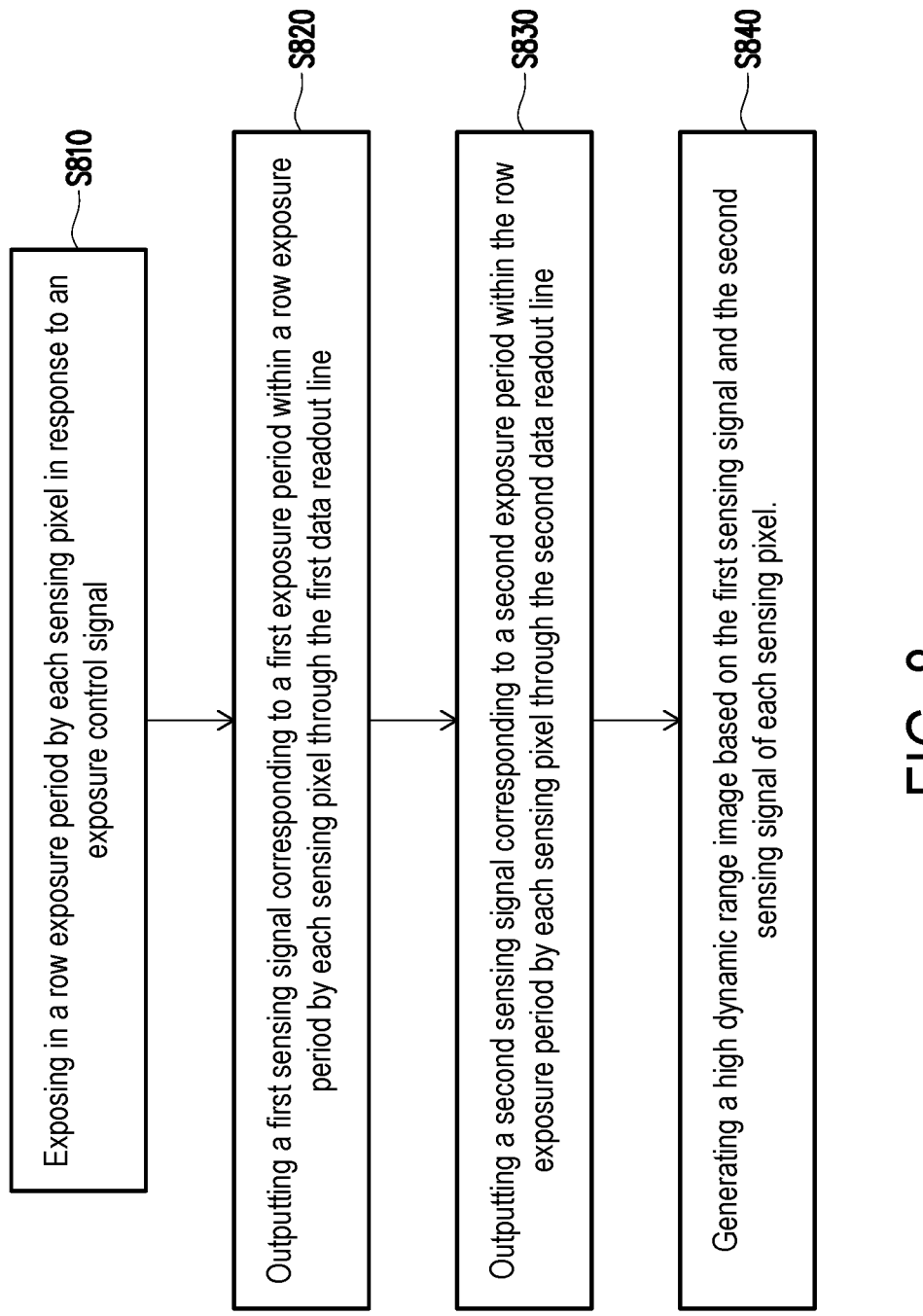

S810

Exposing in a row exposure period by each sensing pixel in response to an exposure control signal

S820

Outputting a first sensing signal corresponding to a first exposure period within a row exposure period by each sensing pixel through the first data readout line

S830

Outputting a second sensing signal corresponding to a second exposure period within the row exposure period by each sensing pixel through the second data readout line

S840

Generating a high dynamic range image based on the first sensing signal and the second sensing signal of each sensing pixel.

FIG. 8

IMAGE SENSING DEVICE AND HIGH DYNAMIC RANGE IMAGE GENERATION METHOD THEREOF

CROSS-REFERENCE TO RELATED APPLICATION

This application claims the priority benefit of Taiwan application serial no. 112127432 filed on Jul. 21, 2023. The entirety of the above-mentioned patent application is hereby incorporated by reference herein and made a part of this specification.

BACKGROUND

Technical Field

The disclosure relates to a high dynamic range image generation technology, and in particular relates to an image sensing device and a high dynamic range image generation method thereof.

Description of Related Art

When a user operates an electronic device with photographic capabilities, if the photographic scene contains areas of both high and low brightness, the resulting image may exhibit issues such as overly dark areas or excessive exposure in bright areas. That is, when the dynamic range of the scene exceeds the dynamic range of the image sensor, it indicates that there are extreme bright and dark areas in the shooting scene, which exceed the tonal range that the photosensitive element may record. Therefore, there will be areas in the photo that are either completely black or completely white.

In order to overcome this defect, an image sensor may be used to continuously capture multiple images according to different exposure settings and synthesize these images into a high dynamic range (HDR) image. However, shooting multiple images may encounter problems such as hand shaking or movement of objects in the scene, resulting in the inability to perfectly align multiple images, which in turn leads to blurred areas in the synthesized HDR image. Furthermore, the image sensor may be improved, where different sensing pixel units of the image sensor may be designed to capture images based on different exposure settings. However, the high dynamic range images produced by this method require a sacrifice in image resolution. How to generate high-quality high dynamic range images is a direction that technical personnel are dedicated to.

SUMMARY

In view of this, an electronic device and a high dynamic range image generation method thereof, which may generate high-quality high dynamic range images, are provided in the disclosure.

An image sensing device, which includes a pixel array, a readout circuit, and a processing circuit, is provided in an embodiment of the disclosure. The pixel array includes multiple sensing pixels, and each of the sensing pixels is electrically connected to multiple data readout lines. The readout circuit is electrically connected to the data readout lines, and the data readout lines of each of the sensing pixels include a first data readout line and a second data readout line. The processing circuit is electrically connected to the readout circuit. Each of the sensing pixels outputs a first sensing signal corresponding to a first exposure period within a row exposure period through the first data readout line, and each of the sensing pixels outputs a second sensing signal corresponding to a second exposure period within the row exposure period through the second data readout line. A period length of the first exposure period is different from a period length of the second exposure period. The processing circuit generates a high dynamic range image based on the first sensing signal and the second sensing signal of each of the sensing pixels.

A high dynamic range image generation method, which is adapted for an image sensing device including multiple sensing pixels, is provided in an embodiment of the disclosure, and includes the following operation. In response to an exposure control signal, exposing in a row exposure period by each sensing pixel, in which each of the sensing pixels is electrically connected to a first data readout line and a second data readout line. A first sensing signal is output corresponding to a first exposure period within the row exposure period by each of the sensing pixels through the first data readout line. A second sensing signal is output corresponding to a second exposure period within the row exposure period by each of the sensing pixels through the second data readout line, in which a period length of the first exposure period is different from a period length of the second exposure period. A high dynamic range image is generated based on the first sensing signal and the second sensing signal of each of the sensing pixels.

Based on the above, in embodiments of the disclosure, the same sensing pixel in the image sensing device may simultaneously generate sensing data corresponding to different exposure conditions. By respectively performing pixel data fusion on multiple sensing data of each of the sensing pixels, high-quality high dynamic range images may be generated without sacrificing image resolution.

BRIEF DESCRIPTION OF THE DRAWINGS

FIG. 8 is a flowchart of a high dynamic range image generation method according to an embodiment of the disclosure.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the method and device within the scope of the patent application of the disclosure.

Figure 1:
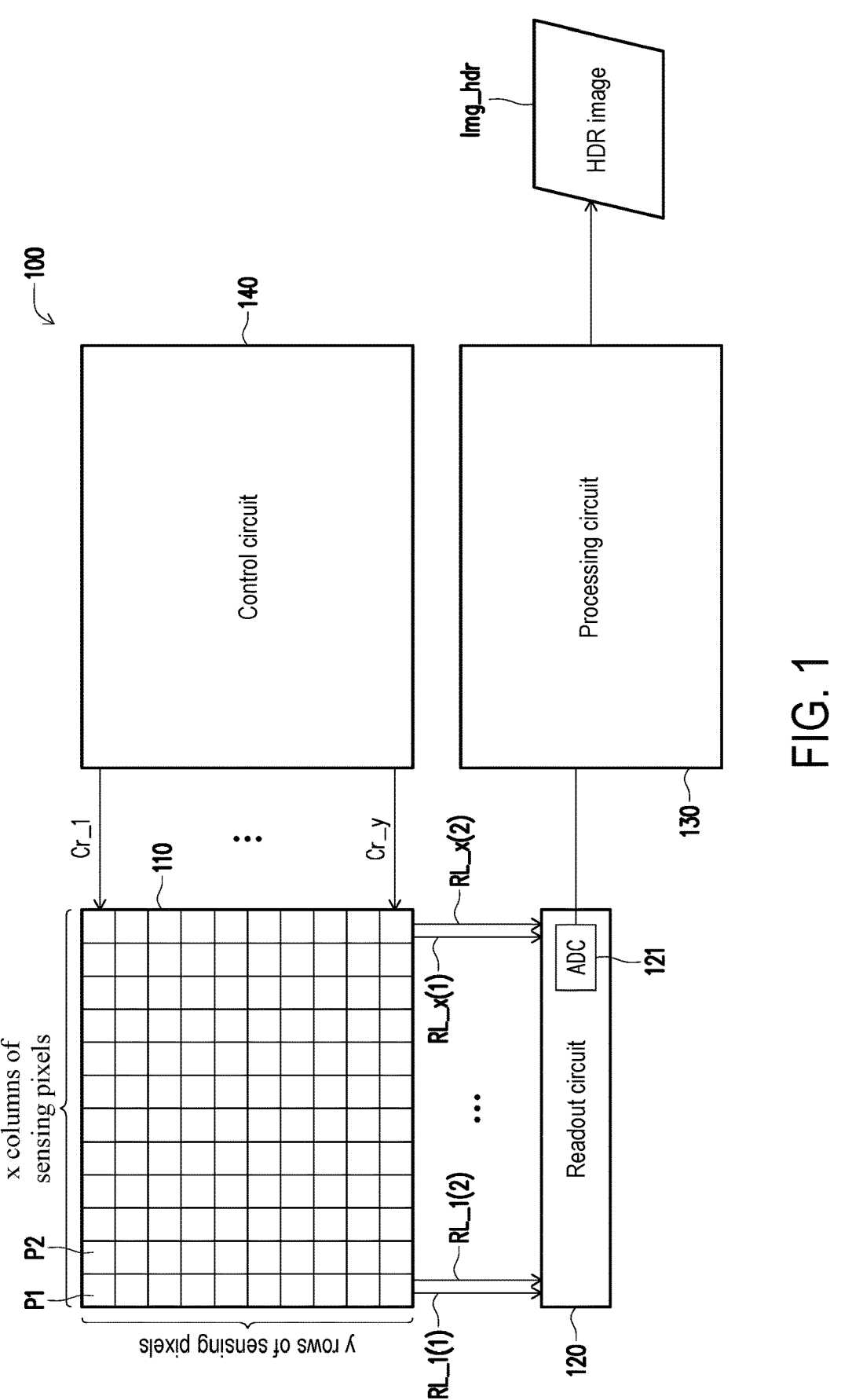
FIG. 1 is a schematic diagram of an image sensing device according to an embodiment of the disclosure.

FIG. 1 is a schematic diagram of an image sensing device according to an embodiment of the disclosure. Referring to FIG. 1, the image sensing device 100 is configured to provide image sensing functions. Specifically, the image sensing device 100 may include a photosensitive element, such as a charge coupled device (CCD), a complementary metal-oxide semiconductor (CMOS) element or other elements, which is not limited in the disclosure. In some embodiments, the image sensing device 100 may be combined with other elements (e.g., a lens, an aperture, etc.) to form a camera module of an electronic device. The image sensing device 100 may include a pixel array 110, a readout circuit 120, a processing circuit 130, and a control circuit 140.

The pixel array 110 may include x*y sensing pixels (x and y are integers greater than 0), and these sensing pixels are arranged in x columns and y rows. For example, the pixel array 110 may include a sensing pixel P1 in the first row and the first column, a sensing pixel P2 in the first row and the second column, and so on. These sensing pixels on the pixel array 110 may be passive pixel sensors (PPS), active pixel sensors (APS), or digital pixel sensors (DPS), the disclosure is not limited thereto.

The sensing pixels may each include at least one photodiode for photoelectric conversion. Photodiodes are configured to convert light energy into electrical energy, which may generate charges in response to light irradiated on the sensing pixels. The amount of charge generated by the photodiode is related to the intensity of the light and the exposure time. In addition, in some embodiments, other optical elements, such as filters, etc., may be disposed above the pixel array 110, and the disclosure is not limited thereto.

Each sensing pixel in the pixel array 110 is electrically connected to multiple data readout lines, and the data readout lines of each sensing pixel include a first data readout line and a second data readout line. For example, the sensing pixel P1 located in the first column and the first row of the pixel array 110 may be electrically connected to two data readout lines, which are the data readout line RL_1(1) and the data readout line RL_1(2). It should be noted that FIG. 1 illustrates an example in which each sensing pixel is connected to two data readout lines, but the disclosure is not limited thereto. Each sensing pixel may be connected to more data readout lines. In addition, sensing pixels in the same column may be connected to the same multiple data readout lines. For example, as shown in FIG. 1, the sensing pixels in the first column may be electrically connected to the data readout line RL_1(1) and the data readout line RL_1(2), and the sensing pixels in the xth column may be electrically connected to two data readout lines, data readout line RL_x(1) and data readout line RL_x(2).

The readout circuit 120 is electrically connected to multiple data readout lines of each sensing pixel. In some embodiments, sensing pixels in the same column may be connected to the same m data readout lines, and the readout circuit 120 is electrically connected to m*x data readout lines. In other words, the readout circuit 120 may be electrically connected to multiple data readout lines of each column of sensing pixels. For example, as shown in FIG. 1, the readout circuit 120 may be electrically connected to 2*x data readout lines. The readout circuit 120 may be electrically connected to the data readout line RL_1(1) and the data readout line RL_1(2) of the sensing pixels in the first column, and the readout circuit 120 may be electrically connected to the data readout line RL_x(1) and the data readout line RL_x(2) of sensing pixels in the xth column. In some embodiments, the readout circuit 120 may include a column amplifier, an analog-to-digital conversion (ADC) circuit, a data transmission circuit, or other circuits.

Each sensing pixel generates charges based on its photodiode in response to light irradiation and outputs sensing signals. These sensing signals are read out by the readout circuit 120 to generate corresponding digital sensing data. In the embodiment of the disclosure, the readout circuit 120 may read out multiple sensing signals output by each sensing pixel through multiple data readout lines. For example, as shown in FIG. 1, the readout circuit 120 may read out the first sensing signal output by the sensing pixel P1 through the data readout line RL_1(1) and the second sensing signal output by the sensing pixel P1 through the data readout line RL_1(2). In some embodiments, the readout circuit 120 may read the sensing signals output by each row of sensing pixels row by row.

The control circuit 140 is electrically connected to the pixel array 110 through multiple control lines. As shown in FIG. 1, the control circuit 140 provides exposure control signals to each row of sensing pixels through y control lines. The start and end of a row exposure period of each row of sensing pixels are controlled by corresponding exposure control signals. For example, the control circuit 140 provides the exposure control signal Cr_1 to the sensing pixels in the first row through a control line, and the start and end of the row exposure period of sensing pixels in the first row are controlled by the exposure control signal Cr_1. The control circuit 140 provides the exposure control signal Cr_y to sensing pixels in the yth row through another control line, and the start and end of the row exposure period of the sensing pixels in the yth row are controlled by the exposure control signal Cr_y. The photodiodes of each row of sensing pixels may be exposed during the row exposure period to continuously generate corresponding charges.

The processing circuit 130 is electrically connected to the readout circuit 120 for receiving the digital sensing data output by the readout circuit 120. The processing circuit 130 is configured to store digital sensing data or perform image processing functions (e.g., tone mapping, cropping, rotating, adjusting brightness, adjusting contrast, or others).

In an embodiment of the disclosure, multiple data readout lines of each sensing pixel may output sensing signals corresponding to different exposure periods. Specifically, each sensing pixel may output a first sensing signal corresponding to a first exposure period within the row exposure period through the first data readout line. Furthermore, each sensing pixel may output a second sensing signal corresponding to a second exposure period within the row exposure period through the second data readout line. A period length of the first exposure period is different from a period length of the second exposure period. The first exposure period overlaps the second exposure period. That is, each sensing pixel may output multiple sensing signals corresponding to different exposure periods through multiple data readout lines.

As shown in FIG. 1, the sensing pixel P1 may output a sensing signal corresponding to the first exposure period within the row exposure period through the data readout line RL_1(1). Furthermore, the sensing pixel P1 may output a sensing signal corresponding to the second exposure period within the row exposure period through the data readout line RL_1(2).

Specifically, when each sensing pixel is exposed during the row exposure period in response to the exposure control signal, multiple sensing signals corresponding to different exposure time lengths may be generated during the same row exposure period. For example, the sensing pixel P1 may simultaneously generate a first sensing signal corresponding to the first exposure period and a second sensing signal corresponding to the second exposure period. For example, the period length of the first exposure period is, for example, 33 ms, and the period length of the second exposure period is, for example, 16 ms.

In some embodiments, the induced charges corresponding to different exposure periods may be stored simultaneously through multiple capacitors in each sensing pixel. Based on this, each sensing pixel may output sensing signals corresponding to different exposure periods through multiple data readout lines according to the induced charges stored in these capacitors corresponding to different exposure periods. Alternatively, in some embodiments, a switching device may be provided on a certain data readout line of each sensing pixel. By controlling the "off" and "on" of the switching device, the readout circuit 140 may read sensing signals corresponding to different exposure periods through multiple data readout lines.

Based on this, the processing circuit 140 may generate the high dynamic range image Img_hdr based on the first sensing signal and the second sensing signal of each sensing pixel. That is, the processing circuit 140 may generate the high dynamic range image Img_hdr based on multiple sensing signals corresponding to different exposure periods of each sensing pixel. Specifically, based on the first sensing signal and the second sensing signal of each sensing pixel, the processing circuit 140 may obtain the first digital sensing data of the first sensing signal and the second digital sensing data of the second sensing signal. Therefore, the processing circuit 140 may perform pixel fusion processing on the first digital sensing data and the second digital sensing data of each sensing pixel, thereby generating a high dynamic range image Img_hdr with a higher number of pixel bits.

Figure 2:
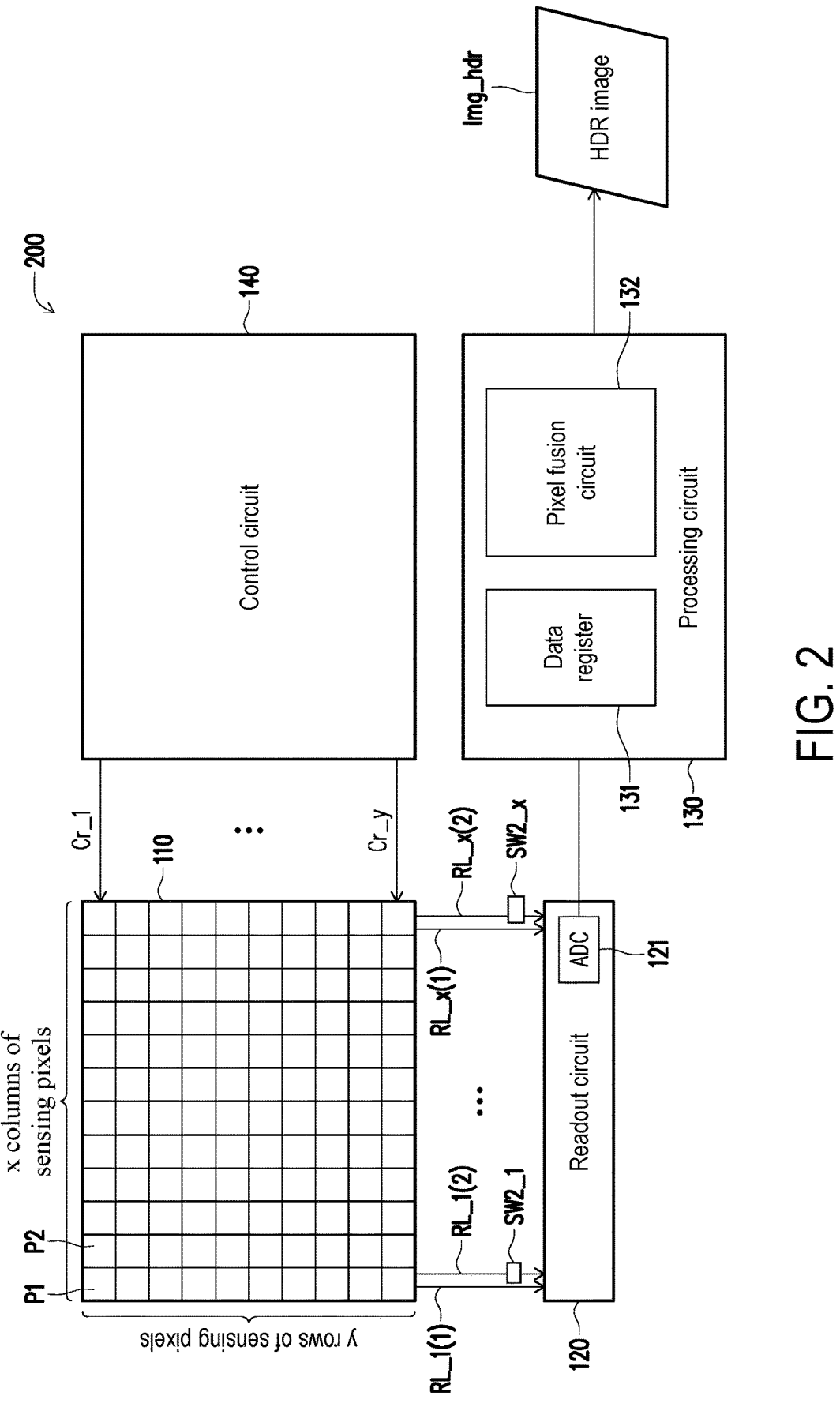
FIG. 2 is a schematic diagram of an image sensing device including multiple switches according to an embodiment of the disclosure.

FIG. 2 is a schematic diagram of an image sensing device including multiple switches according to an embodiment of the disclosure. Referring to FIG. 2, the image sensing device 200 may further include multiple second switching devices. The second data readout line of each sensing pixel is electrically connected to the readout circuit 120 through a corresponding one of the second switching devices. For example, the data readout line RL_1(2) of the sensing pixels in the first column is electrically connected to the readout circuit 120 through the switching device SW2_1. The data readout line RL_x(2) of the sensing pixels in the xth column is electrically connected to the readout circuit 120 through the switching device SW2_x.

In response to each second switching device being turned on during the second exposure period, each sensing pixel outputs a second sensing signal corresponding to the second exposure period through the second data readout line. For example, in response to the switching device SW2_1 being turned on during the corresponding second exposure period, the sensing pixel P1 may output a sensing signal corresponding to the second exposure period through the data readout line RL_1(2).

Specifically, the photodiodes of each sensing pixel continuously generate a corresponding amount of charges in response to the received accumulated photons during the corresponding row exposure period. Based on the "turning on" of the second switching device during the second exposure period and the "turning off" at the end of the second exposure period, the second sensing signal output by the second data readout line may be independent from the amount of photons received by the photodiode after the second exposure period, thereby generating a second sensing signal corresponding to the short exposure period. On the other hand, since there is no switching device, the first sensing signal output by the first data readout line is independent from the amount of photons received by the photodiode after the second exposure period, thereby generating a first sensing signal corresponding to the long exposure period.

In some embodiments, the readout circuit 120 includes multiple first column amplifiers corresponding to multiple first data readout lines and multiple second column amplifiers corresponding to multiple second data readout lines. Each first column amplifier is configured to amplify the first sensing signal, and each second column amplifier is configured to amplify the second sensing signal. That is, each data readout line may be connected to a corresponding column amplifier.

In some embodiments, the readout circuit 120 includes an analog-to-digital converter 121. The analog-to-digital converter 121 converts the first sensing signal of each sensing pixel into first digital sensing data, and converts the second sensing signal of each sensing pixel into second digital sensing data.

In some embodiments, the processing circuit 130 includes a data register 131. The data register 131 is configured to record the first digital sensing data and the second digital sensing data of each sensing pixel.

In some embodiments, the processing circuit 130 includes a pixel fusion circuit 132. The sensing pixels include a first sensing pixel, and the pixel fusion circuit 132 generates an image pixel of a high dynamic range image according to the first digital sensing data and the second digital sensing data of the first sensing pixel.

Figure 3:
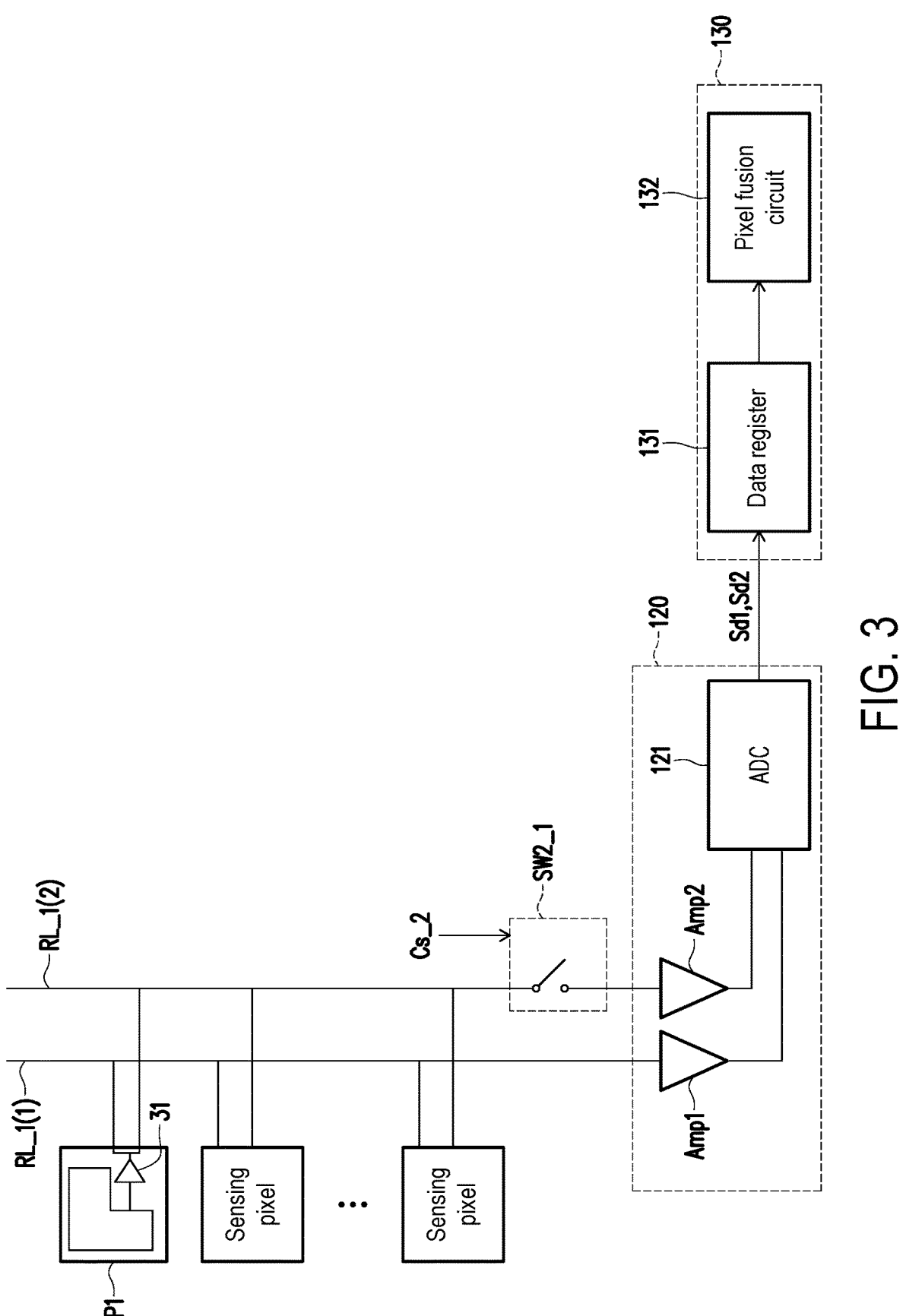
FIG. 3 is a schematic diagram of multiple data readout lines of a column of sensing pixels according to an embodiment of the disclosure.
Figure 4:
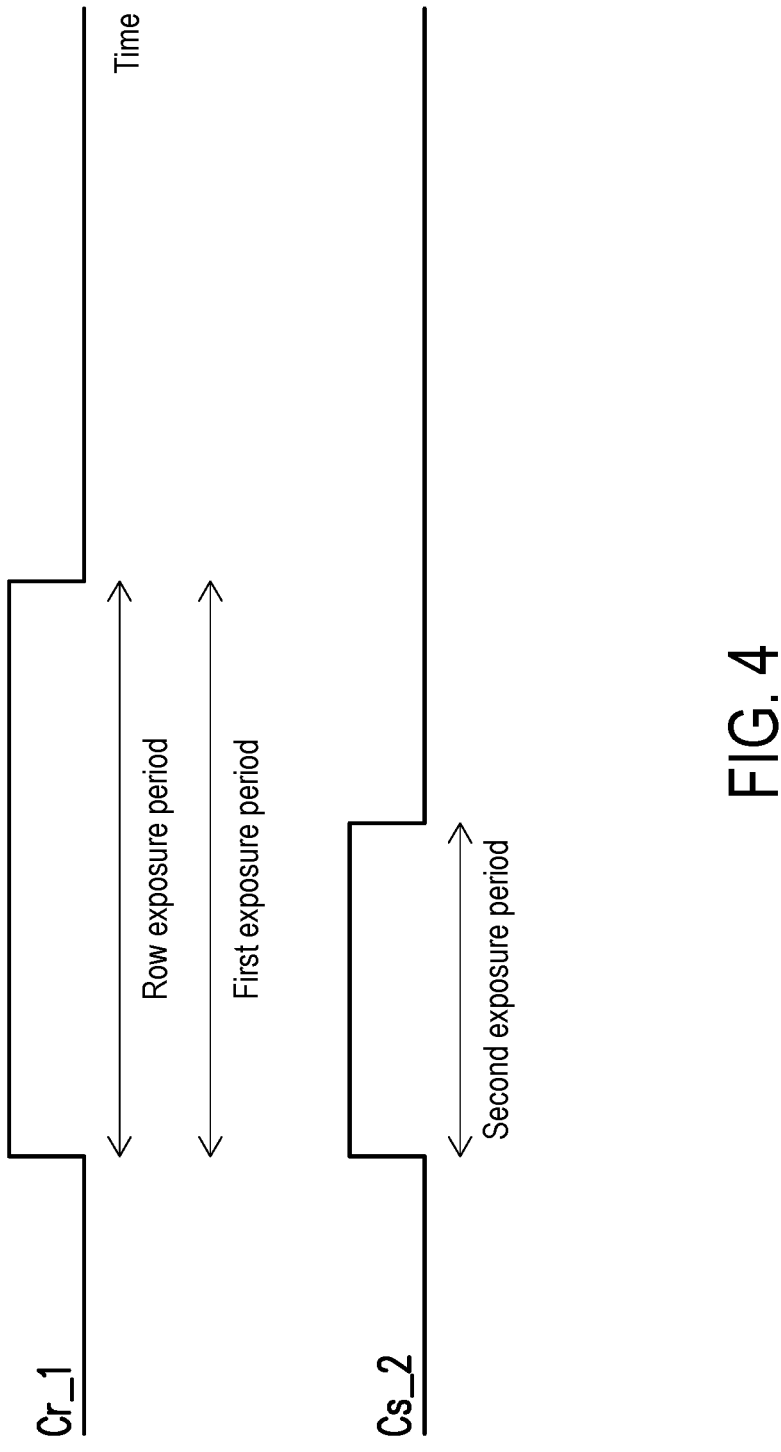
FIG. 4 is a schematic diagram of the first exposure period and the second exposure period according to an embodiment of the disclosure.

In order to explain the principle of this embodiment more clearly, a column of sensing pixels is used as an example for explanation. Those skilled in the art may clearly understand the operating principle of each column of sensing pixels after referring to the following description. FIG. 3 is a schematic diagram of multiple data readout lines of a column of sensing pixels according to an embodiment of the disclosure. FIG. 4 is a schematic diagram of the first exposure period and the second exposure period according to an embodiment of the disclosure. Please refer to FIG. 3 and FIG. 4.

The data readout line RL_1(2) of the sensing pixels in the first column is electrically connected to the readout circuit 120 through the switching device SW2_1. The switching device SW2_1 is turned on or off in response to the level of the control signal Cs_2. The switching device SW2_1 may be implemented by at least one transistor, and the gate of this transistor is configured to receive the control signal Cs_2. In response to the exposure control signal Cr_1, the sensing pixel P1 may generate a sensing signal through the pixel amplifier 31 in response to the photons accumulated and received by the photodiode during the corresponding row exposure period.

After the first exposure period that is the same as the row exposure period, the data readout line RL_1(1) may output a sensing signal corresponding to the first exposure period. That is, the sensing signal output by the data readout line RL_1(1) is generated based on the photons accumulated and received by the photodiode during the first exposure period. On the other hand, after the second exposure period within the row exposure period, the control signal Cs_2 switches the level, causing the switching device SW2_1 to turn off after the second exposure period. In response to the switching device SW2_1 being turned off before the end of the row exposure period, the data readout line RL_1(2) may output a sensing signal corresponding to the second exposure period. That is, the sensing signal output by the data readout line RL_1(2) is generated based on the photons accumulated and received by the photodiode during the second exposure period. As shown in FIG. 4, the row exposure period is the same as the first exposure period, and the first exposure period is longer than the second exposure period.

In addition, the readout circuit 120 includes a column amplifier Amp1 corresponding to the data readout line RL_1(1) and multiple column amplifiers Amp2 corresponding to the data readout line RL_1(2). The column amplifier Amp1 is configured to amplify the sensing signal of the data readout line RL_1(1), and the column amplifier Amp2 is configured to amplify the sensing signal of the data readout line RL_1(2). The analog-to-digital converter 121 converts the sensing signal of the data readout line RL_1(1) into the first digital sensing data sd1, and converts the sensing signal of the data readout line RL_1(2) into the second digital sensing data sd2.

The data register 131 is configured to record the first digital sensing data sd1 and the second digital sensing data sd2 of the sensing pixel P1. The pixel fusion circuit 132 generates an image pixel of a high dynamic range image according to the first digital sensing data sd1 and the second digital sensing data sd2 of the sensing pixel P1. The first digital sensing data sd1 and the second digital sensing data sd2 of the sensing pixel P1 are generated within the same frame acquisition period based on different exposure conditions. In this embodiment, the pixel fusion circuit 132 may perform image fusion on the first digital sensing data and the second digital sensing data of each sensing pixel based on known HDR image processing technology to generate an HDR image, the details of which are not repeated herein.

Figure 5:
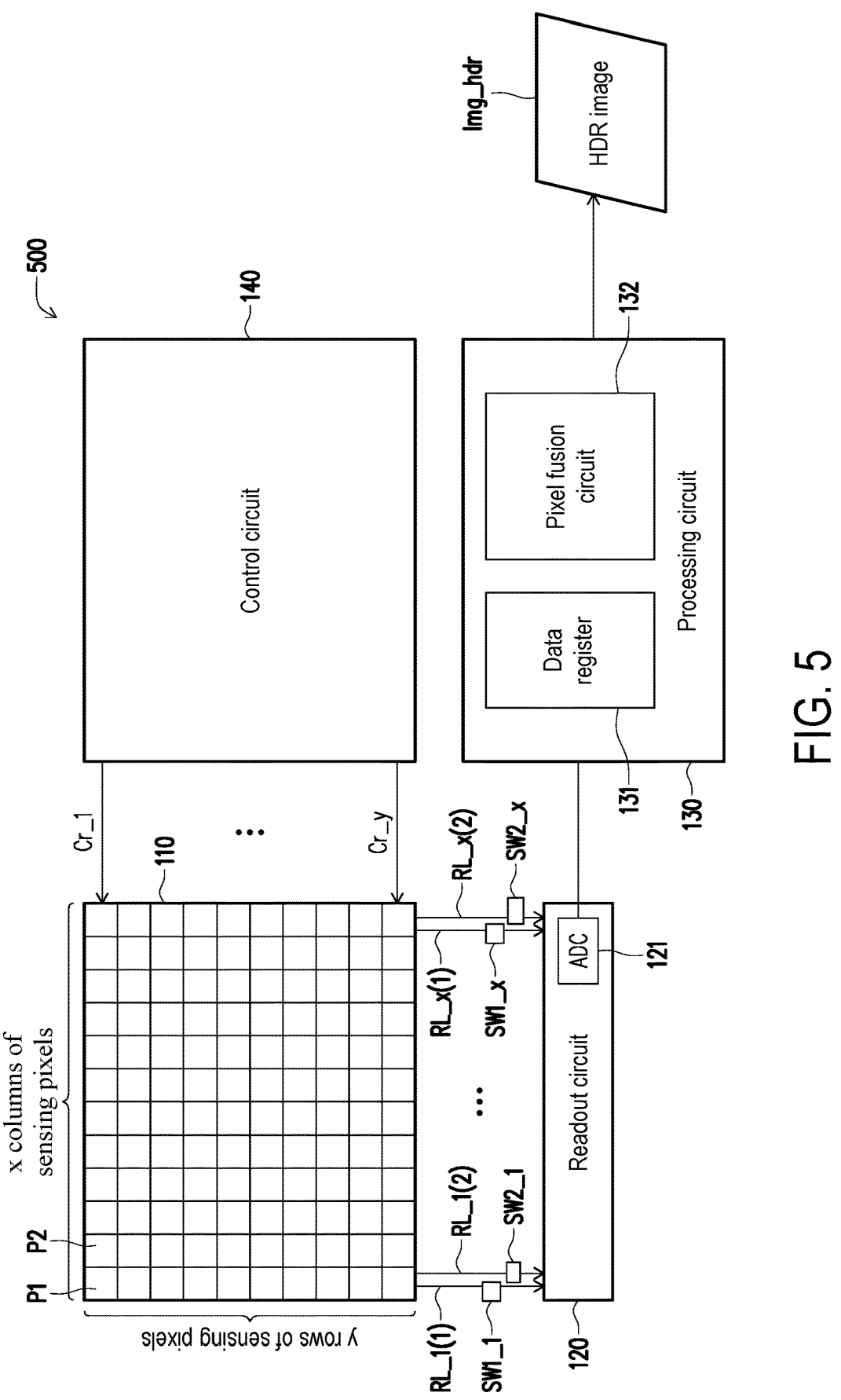
FIG. 5 is a schematic diagram of an image sensing device including multiple switches according to an embodiment of the disclosure.

FIG. 5 is a schematic diagram of an image sensing device including multiple switches according to an embodiment of the disclosure. Referring to FIG. 5, different from the embodiment of FIG. 2, the image sensing device 500 may further include multiple first switching devices. The first data readout line of each sensing pixel is electrically connected to the readout circuit 120 through a corresponding one of the first switching devices. For example, the data readout line RL_1(1) of the sensing pixels in the first column is electrically connected to the readout circuit 120 through the switching device SW1_1. The data readout line RL_x(1) of the sensing pixels in the xth column is electrically connected to the readout circuit 120 through the switching device SW1_x.

In response to each first switching device being turned on during the first exposure period, each sensing pixel outputs a first sensing signal corresponding to the first exposure period through the first data readout line. For example, in response to the switching device SW1_1 being turned on during the corresponding first exposure period, the sensing pixel P1 may output a sensing signal corresponding to the first exposure period through the data readout line RL_1(1). In this way, by controlling the "off" and "on" of the first switching devices, the period length of the first exposure period may be adjusted, so that the first exposure period may be different from the row exposure period.

Figure 6:
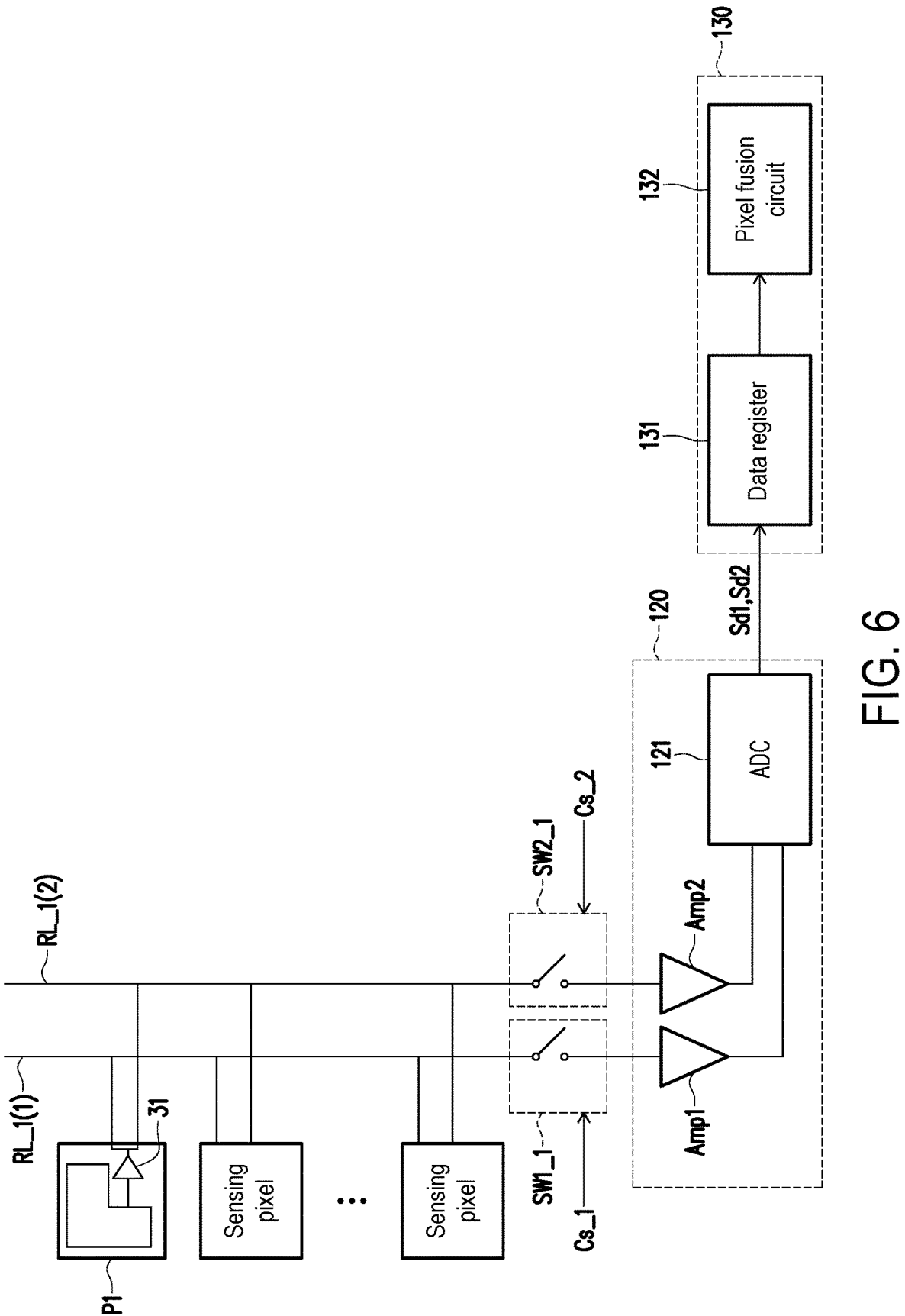
FIG. 6 is a schematic diagram of multiple data readout lines of a column of sensing pixels according to an embodiment of the disclosure.
Figure 7:
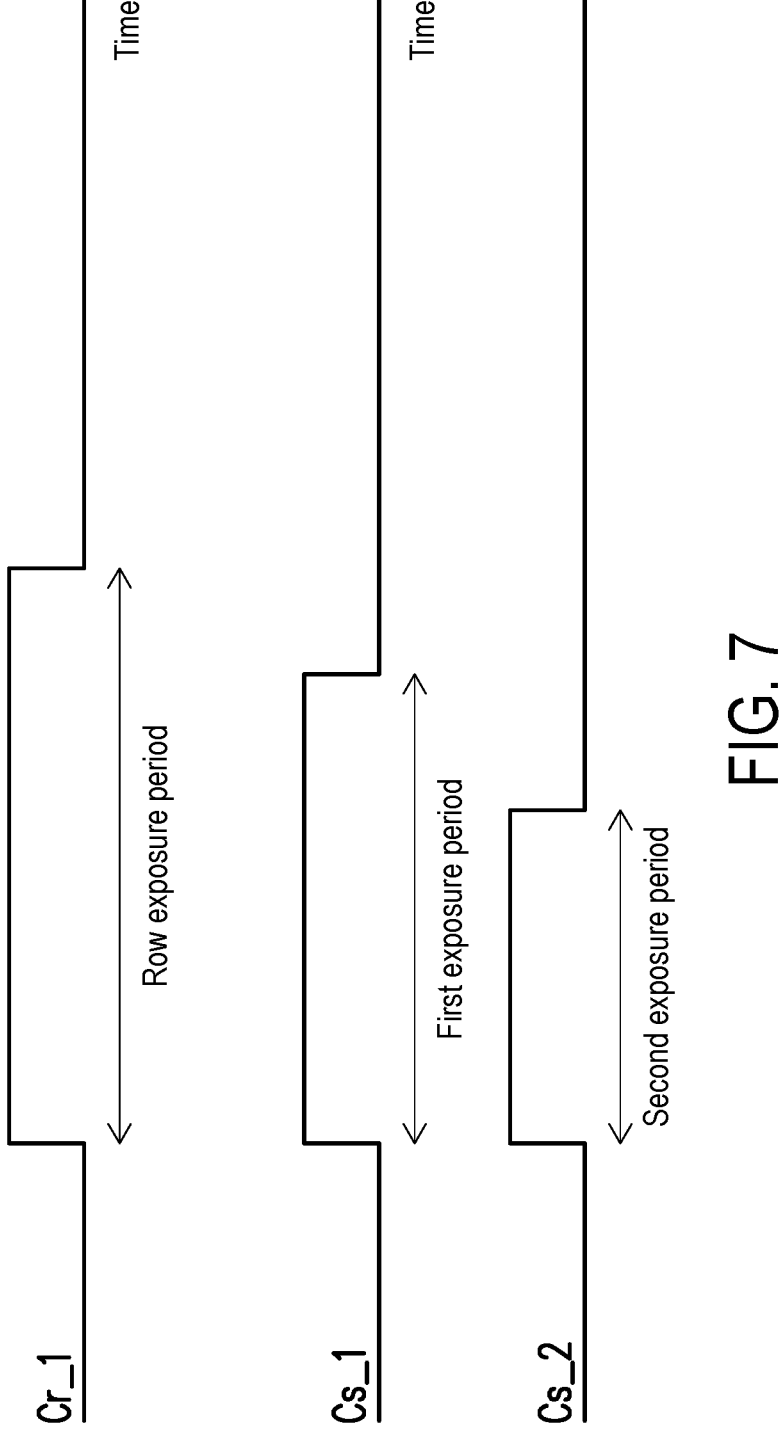
FIG. 7 is a schematic diagram of the first exposure period and the second exposure period according to an embodiment of the disclosure.

In order to explain the principle of this embodiment more clearly, a column of sensing pixels is used as an example for explanation. Those skilled in the art may clearly understand the operating principle of each column of sensing pixels after referring to the following description. FIG. 6 is a schematic diagram of multiple data readout lines of a column of sensing pixels according to an embodiment of the disclosure. FIG. 7 is a schematic diagram of the first exposure period and the second exposure period according to an embodiment of the disclosure. Please refer to FIG. 6 and FIG. 7.

The data readout line RL_1(1) of the sensing pixels in the first column is electrically connected to the readout circuit 120 through the switching device SW1_1. The switching device SW1_1 may be implemented by at least one transistor. The switching device SW1_1 is turned on or off in response to the level of the control signal Cs_1. The data readout line RL_1(2) of the sensing pixels in the first column is electrically connected to the readout circuit 120 through the switching device SW2_1. The switching device SW2_1 is turned on or off in response to the level of the control signal Cs_2. In response to the exposure control signal Cr_1, the sensing pixel P1 may generate a sensing signal through the pixel amplifier 31 in response to the photons accumulated and received by the photodiode during the corresponding row exposure period.

After the first exposure period within the row exposure period, the control signal Cs_1 switches the level, causing the switching device SW1_1 to turn off after the first exposure period. In response to the switching device SW1_1 being turned off before the end of the row exposure period, the data readout line RL_1(1) may output a sensing signal corresponding to the first exposure period. That is, the sensing signal output by the data readout line RL_1(1) is generated based on the photons accumulated and received by the photodiode during the first exposure period. Similarly, in response to the switching device SW2_1 being turned off before the end of the row exposure period, the data readout line RL_1(2) may output a sensing signal corresponding to the second exposure period. That is, the sensing signal output by the data readout line RL_1(2) is generated based on the photons accumulated and received by the photodiode during the second exposure period. As shown in FIG. 7, the row exposure period is longer than the first exposure period, and the first exposure period is longer than the second exposure period.

FIG. 8 is a flowchart of a high dynamic range image generation method according to an embodiment of the disclosure. Referring to FIG. 8, in step S810, exposing in a row exposure period by each sensing pixel in response to an exposure control signal. In step S820, a first sensing signal is output corresponding to a first exposure period within the row exposure period by each of the sensing pixels through the first data readout line. In step S830, a second sensing signal is output corresponding to a second exposure period within the row exposure period by each of the sensing pixels through the second data readout line. In step S840, a high dynamic range image is generated based on the first sensing signal and the second sensing signal of each of the sensing pixels. However, each step in FIG. 8 has been described in detail as above, and are not repeated herein.

To sum up, in the embodiments of the disclosure, the same sensing pixel in the image sensing device may simultaneously generate multiple sensing signals corresponding to different exposure periods, and the readout circuit may readout multiple sensing signals corresponding to different exposure periods through corresponding multiple data readout lines. Afterwards, by respectively performing pixel data fusion on multiple sensing data of each of the sensing pixels, high-quality high dynamic range images may be generated without sacrificing image resolution, and blurred high dynamic range images may be avoided.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An image sensing device, comprising:
a pixel array, comprising a plurality of sensing pixels, wherein each of the sensing pixels is electrically connected to a plurality of data readout lines;
a readout circuit, electrically connected to the data readout lines, wherein the data readout lines of each of the sensing pixels comprise a first data readout line and a second data readout line; and
a processing circuit, electrically connected to the readout circuit,
wherein, a first sensing pixel among the sensing pixels is configured to output a plurality of sensing signals corresponding to different exposure periods through the first data readout line and the second data readout line,
each of the sensing pixels outputs a first sensing signal corresponding to a first exposure period within a row exposure period through the first data readout line,
each of the sensing pixels outputs a second sensing signal corresponding to a second exposure period within the row exposure period through the second data readout line, a period length of the first exposure period is different from a period length of the second exposure period,
the processing circuit generates a high dynamic range image based on the first sensing signal and the second sensing signal of each of the sensing pixels.

2. The image sensing device according to claim 1, further comprising a plurality of first switching devices, wherein the first data readout line of each of the sensing pixels is electrically connected to the readout circuit through a corresponding one of the first switching devices,
in response to each of the first switching devices being turned on during the first exposure period, each of the sensing pixels outputs the first sensing signal corresponding to the first exposure period through the first data readout line.

3. The image sensing device according to claim 1, further comprising a plurality of second switching devices, wherein the second data readout line of each of the sensing pixels is electrically connected to the readout circuit through a corresponding one of the second switching devices,
in response to each of the second switching devices being turned on during the second exposure period, each of the sensing pixels outputs the second sensing signal corresponding to the second exposure period through the second data readout line.

4. The image sensing device according to claim 1, wherein the row exposure period is the same as the first exposure period, and the first exposure period is longer than the second exposure period.

5. The image sensing device according to claim 1, wherein the row exposure period is longer than the first exposure period, and the first exposure period is longer than the second exposure period.

6. The image sensing device according to claim 1, wherein the readout circuit comprises a plurality of first column amplifiers corresponding to a plurality of first data readout lines and a plurality of second column amplifiers corresponding to a plurality of second data readout lines, each of the first column amplifiers is configured to amplify the first sensing signal, and each of the second column amplifiers is configured to amplify the second sensing signal.

7. The image sensing device according to claim 1, wherein the readout circuit comprises an analog-to-digital converter, the analog-to-digital converter converts the first sensing signal of each of the sensing pixels into first digital sensing data, and converts the second sensing signal of each of the sensing pixels into second digital sensing data.

8. The image sensing device according to claim 7, wherein the processing circuit comprises a data register, and the data register is configured to record the first digital sensing data and the second digital sensing data of each of the sensing pixels.

9. The image sensing device according to claim 7, wherein the processing circuit comprises a pixel fusion circuit and the pixel fusion circuit generates an image pixel of the high dynamic range image according to the first digital sensing data and the second digital sensing data of the first sensing pixel.

10. A high dynamic range image generation method, adapted for an image sensing device comprising a plurality of sensing pixels, the method comprising:
in response to an exposure control signal, exposing in a row exposure period by each of the sensing pixels, wherein each of the sensing pixels is electrically connected to a first data readout line and a second data readout line, and a first sensing pixel among the sensing pixels is configured to output a plurality of sensing signals corresponding to different exposure periods through the first data readout line and the second data readout line;
outputting a first sensing signal corresponding to a first exposure period within the row exposure period by each of the sensing pixels through the first data readout line;
outputting a second sensing signal corresponding to a second exposure period within the row exposure period by each of the sensing pixels through the second data readout line, wherein a period length of the first exposure period is different from a period length of the second exposure period; and
generating a high dynamic range image based on the first sensing signal and the second sensing signal of each of the sensing pixels.

* * * * *